Patented Feb. 13, 1940

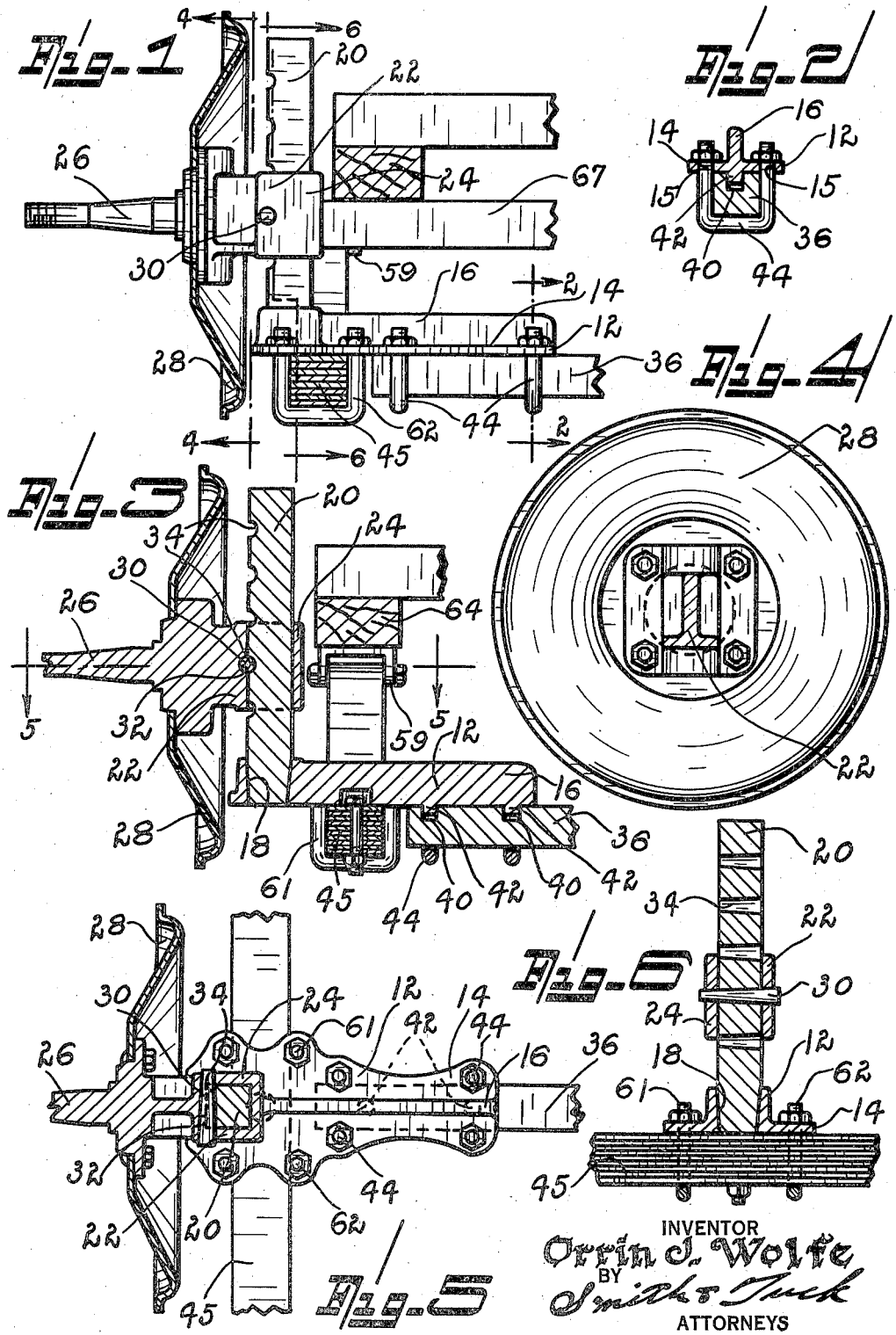

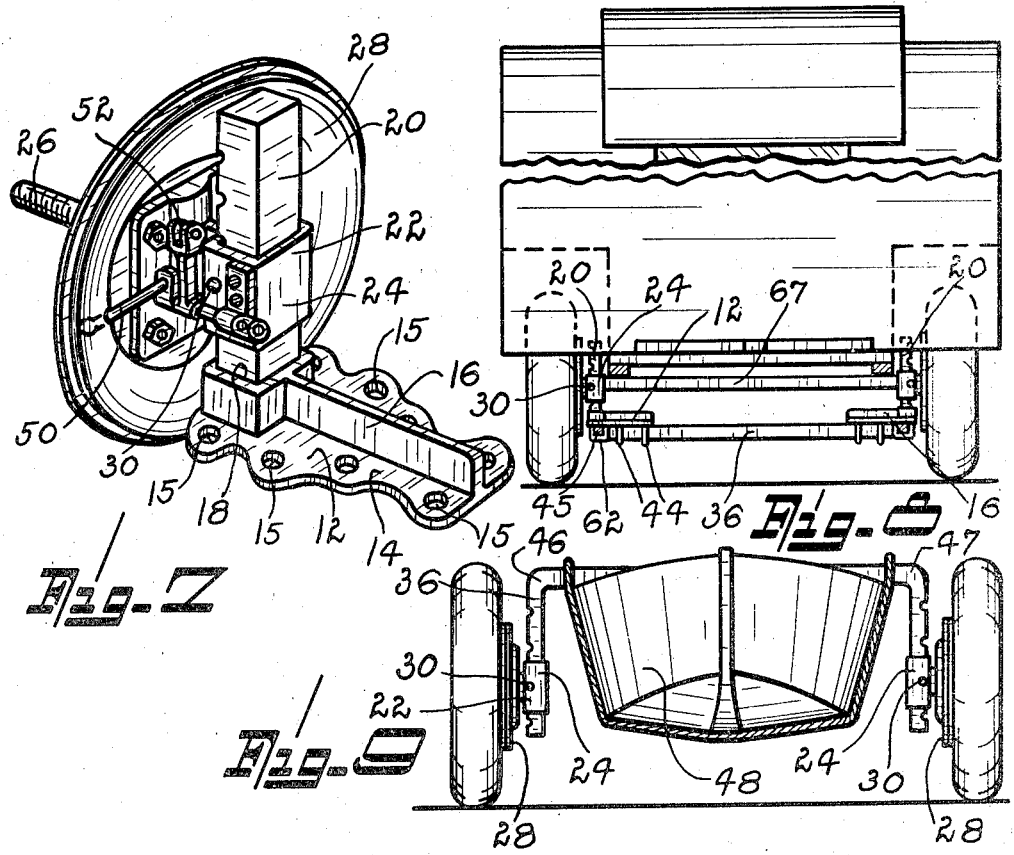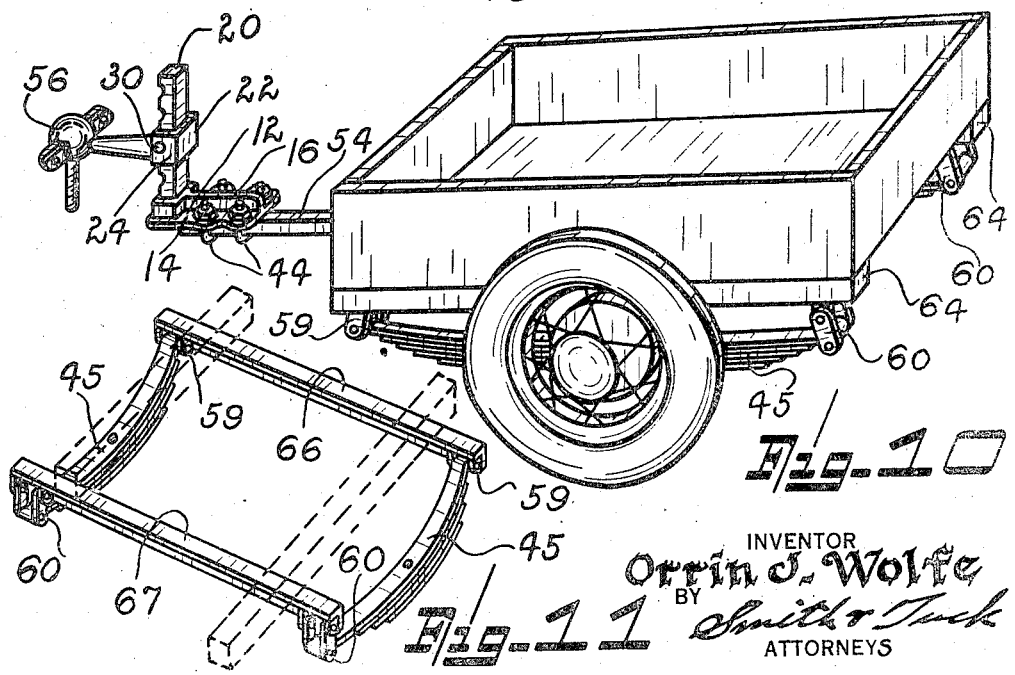

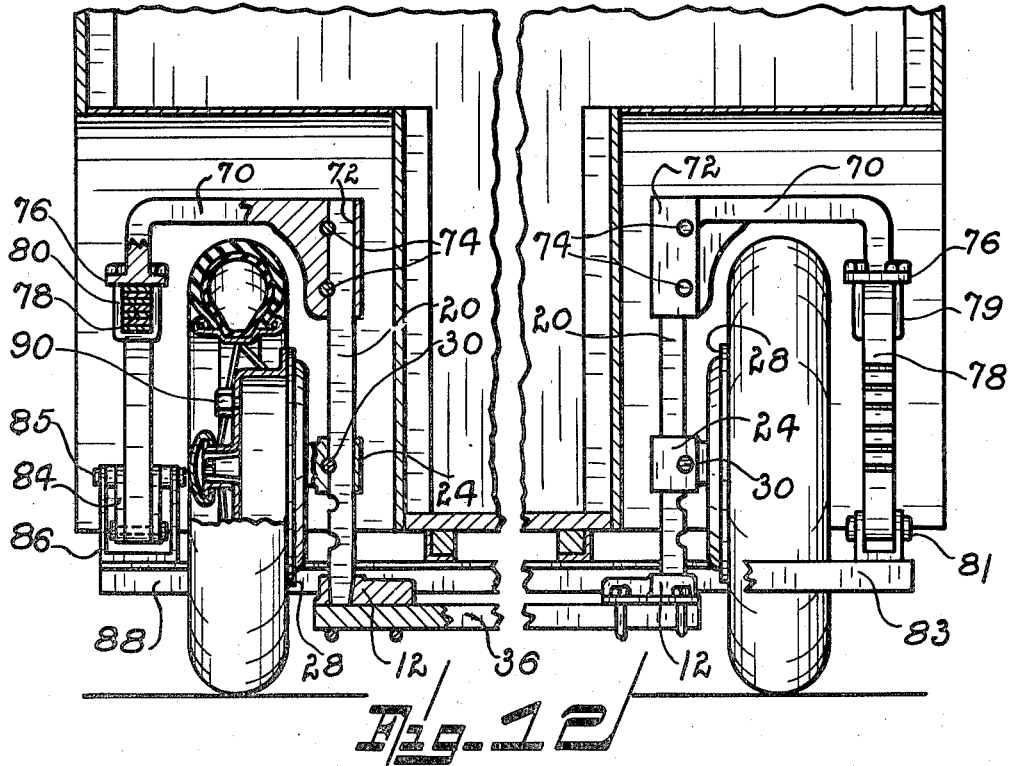
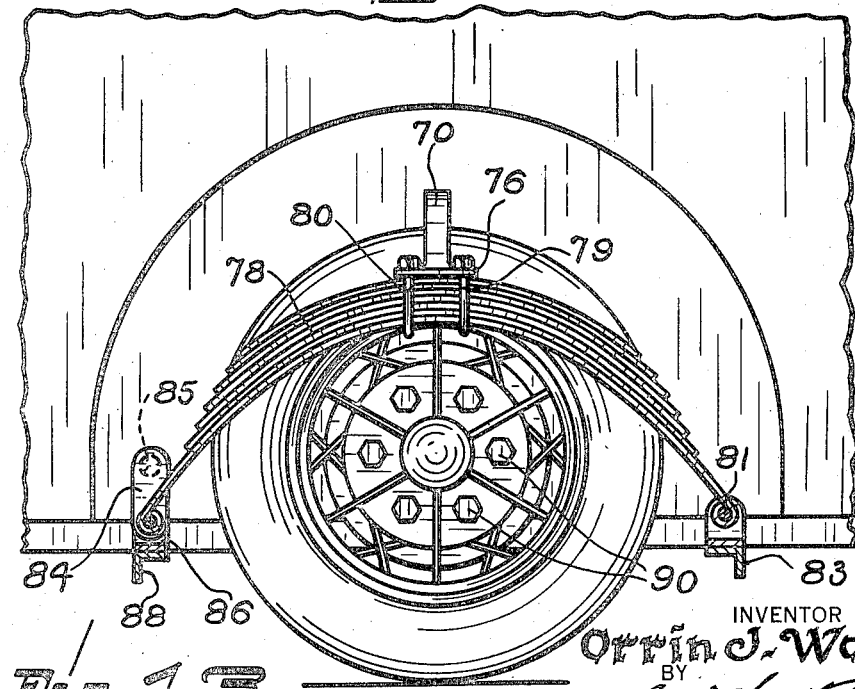

2,190,091

UNITED STATES PATENT OFFICE 2,190,091

ADJUSTABLE TRAILER AXLE

Orrin J. Wolfe, Bellingham, Wash.

Application June 7, 1937, Serial No. 146,888
Renewed July 19, 1939

2 Claims. (Cl. 301—132)

My present invention relates to the art of automobile trailer construction and more particularly to an adjustable trailer axle.

The automobile trailer has developed to the point where it now has a multiplicity of uses. It is employed to supply portable living quarters; for transporting material; and, in special constructions, is employed in the transportation of boats and like equipment. At present it is customary to make a trailer with a road clearance substantially equal to the road clearance of an automobile. In an automobile it is, of course, necessary to adopt a compromise clearance so that the car will be low, in that its center of gravity can be maintained close to the ground, yet at the same time will be capable of passage over ordinary roads. Trailers, on the other hand, are used for the most part on paved roads. The capacity of the average car, itself, to a large degree limits this use to pavement and it has been found that the average automobile does not provide sufficient traction to take heavy trailed loads on the ordinary country roads.

It, therefore, follows that for a trailer the ideal would be to have an actual construction which would be adjustable as to clearance and also could be expanded or contracted to either standard gauge or to greater than standard gauge. For, naturally, if a trailer is going to be used on pavement it should have a minimum clearance so that the normal trailer height can be substantially reduced.

There are other occasions when trailers are going to be used in rutted areas where quite often the owners of automobiles find it desirable to employ oversize wheels or, at least, over size tires, so as to increase the clearance under the car. In this case, the trailer should be capable of providing a clearance at least equal to that of the automobile.

My present construction provides means whereby the clearance under the trailer can be reduced to a minimum for use on pavement so that a very low center of gravity can be obtained and further that the overall height, of a full headroom trailer, can be maintained within reasonable bounds. Further, with my adjustable means it is possible to have an unusually high clearance so that a boat or the like could be supported under the axle and thus be readily launched or removed from the water.

Further, my construction makes it possible to provide various gauge widths with a minimum of expense.

A still further object of my present invention is that it provides a wheel spindle assembly which can be replaced as a unit quicker than the average wheel can be changed so that a complete spindle and bearing assembly can be provided as a spare with a wheel and tire mounted in operating position thereupon.

Another important feature of my present invention is that the same form of construction can be used for the trailer hitch so that the frame of the trailer can be maintained in a level plane even though subject to the wide range of adjustment indicated.

Other and more specific objects will be apparent from the following description taken in connection with the accompanying drawings, wherein Figure 1 is an elevation of a preferred form of my axle assembly, partly in section, taken in the plane parallel to my axle.

Figure 2 is a cross-sectional view along the line 2—2 of Figure 1.

Figure 3 is a view similar to Figure 1 being taken in the same sense, with certain parts, in modified arrangement, further sectioned to more clearly illustrate the construction.

Figure 4 is a cross-sectional view taken along the line 4—4 of Figure 1.

Figure 5 is a top-plan view of the assembly shown in Figure 3 with certain parts shown in section.

Figure 6 is a cross-sectional view along the line 6—6 of Figure 1.

Figure 7 is a perspective view showing my spindle and axle terminal assembly, showing the same with a brake operating mechanism installed thereon.

Figure 8 is an end elevation of a living trailer embodying my invention.

Figure 9 illustrates the use of my assembly for the transportation of a boat.

Figure 10 illustrates the use of my invention as applied to a transport trailer.

Figure 11 is a perspective showing the extension transverse frame member used in large trailers and such as embody the form of construction shown in Figures 1 and 8.

Figure 12 is a transverse view, in elevation, through a trailer incorporating a modified arrangement of my present invention.

Figure 13 is a side elevation of the construction shown in Figure 12.

Referring to the drawings, throughout which like reference characters indicate like part, 12 designates my axle terminal unit. This I normally prefer to form as a casting, preferably of cast steel, having the horizontally disposed flange member 14 provided with a plurality of U-bolt openings 15. In order to achieve strength with the minimum weight I then provide a vertical web as 16 which terminates in its outer end a socket as 18 in which is suitably secured the vertically disposed axle extension member 20. This may be of any desired ,deformed cross-section that will provide security against turning. In the various views for sake of simplicity I have shown the same as square. It will be evident it is believed that any suitable cross-section might be employed provided it assures that the slip spindle 22 cannot change its angular relationship with member 20, or the axle proper. Disposed for movement vertically along member 20 is the slip spindle member 22. It consists essentially of the band portion 24 of a form to provide a close, sliding fit on member 20 and which has either fixedly secured in it, or formed as a part thereof, the wheel spindle 26. This spindle may be made to accommodate any standard type of wheel construction. Normally it will provide the spindle for engagement with antifriction bearing assembly of a standard automobile wheel. Although, it should be apparent that for slow moving service it might be provided with any desired type of wheel. The form shown in the drawing is intended for use with the standard wheel as supplied on the ordinary, light automobile and it is therefore provided with the flanged member 28 which mates with the conventional wheel.

To provide adjustable clearance it is necessary that member 22 be held in fixed adjusted relationship with member 20. Throughout the various views I have shown this accomplished, in what I believe to be the preferred manner, by employing a taper pin as 30 arranged to be seated one-half within the semi-circular opening 32 of member 22 with the other half seated in one of the semi-circular openings 34 of member 20. In this manner a wedging action is obtained which provides intimate contact between members 24 and 20; the taper of the pin locking the assembly as well as tightening it. In this arrangement it will be apparent that the taper pin 30 is in shear throughout its length and can thus resist an abnormal strain.

Terminal members 12 are secured to the ends of axle 36, after the showings as of Figures 1, 2, 3, 5, and 9. The axle is normally deformed at its end to mate with a co-acting deformity in member 12 so as to prevent slippage between the two parts. In Figure 3 I have illustrated this as having been provided by slots 40 in which downwardly extending key members 42, formed as part of plate 12, extend so as to provide against movement. The members are then secured in the desired relationship by a plurality of U-bolts 44. Where large trailers are used it is desirable to have the supporting springs 45 disposed as close to the wheels as possible. For such installations I prefer that the springs will be attached after the showing of Figures 1 and 8.

It will be apparent it is believed that if axles of greater width or less width are desired it is only necessary to substitute a new axle member 36 which can be of any desired type, preferably square. The assembly can be employed as in Figures 1 and 3 or the unit might be inverted so that the axle 36 would be above spindle 26 thus giving unusually high clearance. I have illustrated a modified form of construction in which the axle member itself is bent as at 46 and 47 so as to provide member 20 as part of the axle. In Figure 9 I have illustrated the same as supporting, from its underside, a boat as 48. The terminal plate assembly as 12 could be employed instead of the bends at 46 and 47 and would be employed if a permanent body were to be built on the unit as it would provide greater flexibility in adjustment as and, particularly, in width of tread.

In Figure 7 I have illustrated a conventional brake actuated mechanism attached to my device in which a brake operating rod 50 is disposed in a manner to be actuated by a pull rod or cable attached to lever 52.

In Figure 10 I have illustrated a unit of my device used to couple the tongue 54 of the trailer to a conventional trailer hitch unit 56. The functioning of this member is identical with the other forms shown.

In the majority of trailer constructions it is desirable to use load carrying springs as 45 to save the tires from unnecessary shock loading and for comfort to occupants of the trailer, or to protect the trailer load against shock damage. I have illustrated in some detail in Figures 1, 3, and 6, how these springs are attached to my unit. Normally it is desirable to attach them by U-bolts in the conventional manner, but to position the same at the end of axle member 36 so that they do not provide a restriction in clearance. In the various views I have shown my springs as supported from the usual shackle members as 59 and 60 and secured to plate 12 by U-bolts as 61 and 62. The spring shackles themselves are normally anchored to longitudinal frame members 64 which form the under frame for the trailer body proper, or to transversely extending sub-frame members as 66 and 67 illustrated in Figures 8 and 11. This latter construction is used where special consideration must be given to sidesway or to the stability of the trailer body. Springs 45 should be attached as close to the wheel as will give clearance to the tire if the same should become flat from puncture, or the like.

In Figures 12 and 13 is illustrated means for providing the extreme outward position of the body supporting springs. For this arrangement member 20 is extended upwardly so as to form a mounting for spring anchor 70. This member is provided with a socket as 72 adapted to engage bar 20 and when the proper height adjustment is effected, pins preferably taper pins, are inserted at 74 to fixedly secure the anchor to bar 20. At the outer end of anchor member 70 is provided the spring seat 76. This is adapted to engage the center of spring 78 which is secured thereto by U-bolts 79 and 80. The opposite ends of spring 78 are secured in the conventional manner, one end at 81 preferably pivotally secured to cross member 83. The opposite end is secured to shackle 84 which in turn is pivotally secured at 85 to a U-shaped support member 86 which member is, in turn, fixedly secured to cross member 88.

In locating spring 78, it must be sufficiently far outside the tire so that in the case of the tire becoming deflated the side walls will not be damaged by brushing against the spring and its supporting assembly. This arrangement has been found to be particularly adapted to the house, or living, trailer and it is believed it will be apparent from a study of Figures 12 and 13 that it is relatively simple to change tires with this construction as the nuts of studs 90, which secure the wheel in place, are easily reached; after they are removed the entire wheel assembly can be moved outwardly until the studs are disengaged, at which point the wheel can be lowered and taken out.

The foregoing description and the accompanying drawings are believed to clearly disclose a preferred embodiment of my invention but it will be understood that such changes in the invention may be made as are fairly within the scope and spirit of the following claims.

Having thus fully described my invention what I claim as new and desire to secure by Letters Patent is:

1. In a vehicle axle structure, the combination with a frame, an axle portion mounted on the frame and having an end socket, a post angular in cross section and fitted in said socket, and said post having a series of vertically spaced horizontally extending grooves in its outer face, of a wheel-spindle, a housing rigid with the spindle, said housing being angular in cross section and adjustable on the post, said housing also having a groove co-acting with the first mentioned groove to form a horizontal socket, and a fastening pin mounted in said horizontal socket.

2. In a vehicle-axle structure, the combination with a supporting stub-axle having a squared tapered end-socket, a squared post having a tapered-end fitted in said socket, and said post having a vertical series of tapered horizontal grooves in its outer face, of a spindle, a hub rigid with the spindle and a squared housing integral with the hub, said hub having a tapered horizontal groove co-acting with the first groove to form a tapered socket and said housing being adjustably mounted on the post, and a fastening pin fitted in the tapered socket.

ORRIN J. WOLFE.